Patented Nov. 16, 1937

2,099,066

UNITED STATES PATENT OFFICE 2,099,066

HYDROGENATED RESIN ESTERS AND METHOD OF PRODUCING

Irvin W. Humphrey, Wilmington, Del., assignor to Hercules Powder Company, Wilmington, Del., a corporation of Delaware No Drawing. Original application January 16, 1929, Serial No. 333,033, now Patent No. 1,877,179. Divided and this application April 15, 1932, Serial No. 605,547

31 Claims. (Cl. 260—99.40)

My invention relates to hydrogenated esters of resin acids, as those of abietic acid, pimaric acid, the fossil rosin acids, etc., prepared either by treating the hydrogenated resin acid with an alcohol, or by hydrogenating the resin ester, as a new product of manufacture and to a method for producing the same.

Hydrogenated esters of resin acids according to my invention have not heretofore been known, and according to my investigations I have found that they have substantial advantage in the commercial arts over the generally known ester gums. The hydrogenated esters of abietic acid, for example, have special advantage in that on exposure their protective coatings retain their flexibility for a longer period than when the non-hydrogenated esters are employed, while, at the same time, they possess otherwise the advantages of the known ester gums.

The hydrogenated esters in accordance with my invention may be produced by esterifying a hydrogenated resin acid, as for example, dihydro- or tetrahydro-abietic acid with an alcohol, as for example, ethyl, butyl, propyl, amyl, fenchyl, etc., or with a polyhydric alcohol, as a glycol, glycerol, pentaerythrite, mannitol, xylitol, anneaheptite, etc. Alternatively a resin acid, as abietic acid, pimaric acid, etc., may be esterified with an alcohol and the ester formed subsequently hydrogenated. Hydrogenation of the esters will be usually effected in the liquid phase, but in the case of volatile esters, as for example, ethyl abietate, it is possible to effect hydrogenation in the vapor phase. Further, hydrogenation may be combined with esterification, as by heating the resin acid with an alcohol at atmospheric or higher pressure depending upon the boiling point of the alcohol, in the presence of a suitable catalyst, as platinum, nickel, palladium, etc. while treating with hydrogen.

The hydrogenated esters may be prepared in accordance with the method embodying my invention, for example, by esterifying dihydro- or tetrahydro-abietic acid with, for example, amyl alcohol. As illustrative of the practical adaptation of the method in accordance with my invention, for example, 300 g. of hydrogenated rosin, or dihydro-abietic acid, 900 g. of amyl alcohol and 10 g. of boric anhydride are refluxed for about twenty-five hours. About 25 g. of soda ash is then added, the alcohol distilled off and the ester distilled under reduced pressure with a yield of about 225 g. of amyl dihydro-abietate, acid number about 10.

As a further illustration the ethyl ester of dihydro-abietic acid may be prepared by dissolving 40 parts of sodium hydroxide in 400 parts of ethyl alcohol and then dissolving in the solution 300 parts of hydrogenated rosin or of dihydro-abietic acid. To the solution thus formed 80 parts of ethyl chloride are added and the solution is heated in an autoclave at about 150° C. under a pressure of about 170 pounds for one hour. After the completion of the heating the sodium chloride formed is filtered off, about 10 g. of soda ash is added, the alcohol is distilled off and the ester distilled under reduced pressure with a yield of about 260 parts of ethyl dihydro-abietate, acid number 6.

As a further illustration, for example, in the preparation of methyl dihydro-abietate, 20 parts of sodium hydroxide, 250 parts of ethyl alcohol and 150 parts of hydrogenated rosin or dihydro-abietic acid are refluxed until a clear solution is obtained, after which 45 parts of dimethyl sulphate are gradually added and the mixture heated for a period of about 5 hours. On completion of the heating period about 8 parts of soda ash are added, the alcohol distilled off and the ester formed distilled off under reduced pressure. A yield of about 120 parts of methyl dihydro-abietate, acid number 5, will be obtained.

The hydrogenated esters in accordance with my invention may, for example, be prepared by first esterifying a resin acid, as abietic acid, pimaric acid, etc., for example, by the method given above using a rosin as such, or abietic acid, pimaric acid, or the like, and then subjecting the ester produced to hydrogenation. The ester may be hydrogenated by treating with hydrogen in the presence of a catalyst, as for example, palladium, platinum, nickel, cobalt, nickel-copper, or the like, at room or elevated temperature and under atmospheric or increased pressure, depending upon the catalyst used.

In effecting hydrogenation of the ester, for example, if palladium be used as the catalyst the hydrogenation may be effected at room temperature and under atmospheric pressure, while if a catalyst containing nickel is used a temperature within about the range 200° C.–300° C. will be necessary, though the hydrogenation may be effected under atmospheric pressure. In effecting the hydrogenation increased pressure will be found advantageous and the hydrogenation may be effected at pressures say within about the range 30–200 pounds per square inch.

As illustrative of the preparation of a hydrogenated ester by hydrogenating an ester, for example, about 2% of catalytic nickel is added to the glycerol, or ethyl ester of abietic acid, prepared by esterifying rosin, as such, or abietic acid, and the ester heated to a temperature of about 250° C. under atmospheric pressure for about 15 hours, while passing in a current of hydrogen. The time required to effect hydrogenation of the ester may be shortened by hydrogenating under increased pressure and the ester may, if desired, be treated in solution in, for example, alcohol, acetic acid, ethyl acetate, an ether, or the like.

In the hydrogenation of the ester, for example, ethyl abietate, which possesses two unsaturated double bonds, by treatment with hydrogen, it will be found that the ester will absorb hydrogen rather rapidly until one double bond is saturated, forming ethyl dihydro-abietate, and thereafter only a little more hydrogen will be absorbed under the usual conditions of hydrogenation.

The formation of the ester of tetrahydroabietic acid is favored by using a solvent, as suggested above, and hydrogenating for a longer period under pressure. For some purposes the tetrahydro ester is better than the dihydro ester.

The hydrogenated esters in accordance with my invention are admirably adapted as ingredients for coating compositions, as in varnishes and lacquers in substitution for rosin esters and fossil resins, and in some cases will be found valuable as plasticizers.

It will be understood that the esters in accordance with my invention may be produced from resin acids, as contained in resins, as rosin, fossil resins, etc., or from the resin acids, as such, as abietic acid, pimaric acid, etc.

This application constitutes a division of the application for patent for Improvement in hydrogenated resin esters and method of producing, filed by me January 16, 1929, Serial No. 333,033 and which has eventuated in United States Letters Patent No. 1,877,179.

What I claim and desire to protect by Letters Patent is:

1. The method of preparing a hydrogenated resin acid ester which includes esterifying a resin acid which has been hydrogenated in the presence of a base metal hydrogenation catalyst.

2. The method of preparing a hydrogenated resin acid ester which includes esterifying hydrogenated abietic acid.

3. The method of preparing a hydrogenated resin acid ester which includes esterifying hydrogenated rosin.

4. The method of preparing a hydrogenated resin acid ester which includes hydrogenating a resin acid in the presence of a base metal hydrogenation catalyst and esterifying the hydrogenated resin acid with a monohydric alcohol.

5. The method of preparing a hydrogenated resin acid ester which includes hydrogenating abietic acid in the presence of a base metal hydrogenation catalyst and esterifying the hydrogenated abietic acid with a monohydric alcohol.

6. The method of preparing a hydrogenated resin acid ester which includes hydrogenating a resin acid in the presence of a base metal hydrogenation catalyst and combining the hydrogenated resin acid radical with a methyl group.

7. The method of preparing a hydrogenated resin acid ester which includes hydrogenating a resin acid in the presence of a base metal hydrogenation catalyst and combining the hydrogenated resin acid radical with an ethyl group.

8. The method of preparing a hydrogenated resin acid ester which includes hydrogenating abietic acid in the presence of a base metal hydrogenation catalyst and combining the hydrogenated abietic acid radical with a methyl group.

9. The method of preparing a hydrogenated resin acid ester which includes hydrogenating abietic acid in the presence of a base metal hydrogenation catalyst and combining the hydrogenated abietic acid radical with an ethyl group.

10. The method of preparing a hydrogenated resin acid ester which includes hydrogenating rosin in the presence of a base metal hydrogenation catalyst and esterifying the hydrogenated rosin with a monohydric alcohol.

11. The method of preparing a hydrogenated resin acid ester which includes hydrogenating rosin in the presence of a base metal hydrogenation catalyst and esterifying the hydrogenated rosin with an alcohol.

12. The method of preparing a hydrogenated resin acid ester which includes hydrogenating rosin in the presence of a base metal hydrogenation catalyst and esterifying the hydrogenated rosin with methanol.

13. The method of preparing a hydrogenated resin acid ester which includes hydrogenating rosin in the presence of a base metal hydrogenation catalyst and esterifying the hydrogenated rosin with ethyl alcohol.

14. The method of preparing a hydrogenated resin acid ester which includes hydrogenating a resin acid in the presence of a hydrogenation catalyst and esterifying the hydrogenated resin acid with an alcohol.

15. The method of preparing a hydrogenated rosin ester which includes hydrogenating rosin in the presence of a hydrogenation catalyst and esterifying the hydrogenated rosin with an alcohol.

16. The method of preparing a hydrogenated abietic acid ester which includes hydrogenating abietic acid in the presence of a hydrogenation catalyst and esterifying the hydrogenated abietic acid with an alcohol.

17. The method of preparing a hydrogenated resin ester which includes hydrogenating rosin in the presence of a noble metal hydrogenation catalyst and esterifying the hydrogenated rosin with an alcohol.

18. The method of preparing a hydrogenated resin acid ester which includes hydrogenating rosin in the presence of a hydrogenation catalyst and esterifying the hydrogenated rosin with an alcohol in the presence of an esterification catalyst.

19. The method of preparing a hydrogenated resin acid ester of an alcohol, which includes esterifying a hydrogenated resin with an alcohol.

20. The method of preparing a hydrogenated resin acid ester, which includes esterifying a hydrogenated resin acid.

21. The method of preparing a hydrogenated resin acid ester, which includes esterifying a dihydro rosin acid.

22. The method of preparing a hydrogenated resin acid ester, which includes esterifying a tetrahydro rosin acid.

23. The method of preparing a hydrogenated resin acid ester, which includes combining a hydrogenated rosin acid radical with an alkyl radical.

24. The method of preparing a hydrogenated resin acid ester, which includes esterifying a hydrogenated rosin acid by heating under pressure with a monohydric alcohol.

25. The method of preparing a hydrogenated resin acid ester, which includes esterifying a hydrogenated rosin acid with methanol.

26. The method of preparing a hydrogenated resin acid ester, which includes esterifying a hydrogenated rosin acid with ethyl alcohol.

27. The method of preparing a hydrogenated resin acid ester, which includes simultaneously hydrogenating a rosin acid and esterifying with an alcohol.

28. The method of preparing a hydrogenated resin acid ester, which includes simultaneously hydrogenating a rosin acid and esterifying with a monohydric alcohol.

29. As a new product a monohydric alcohol ester of a tetrahydro rosin acid.

30. As a new product an ester of a tetrahydro resin acid.

31. As a new product a tetrahydro ester of abietic acid.

IRVIN W. HUMPHREY.